(12) United States Patent
Waltner et al.

(10) Patent No.: US 10,124,889 B2
(45) Date of Patent: Nov. 13, 2018

(54) TAIL ROTOR FAILURE RECOVERY CONTROLLER

(71) Applicant: Sikorsky Aircraft Corporation, Stratford, CT (US)

(72) Inventors: Peter James Waltner, Royal Palm Beach, FL (US); Glen Knaust, Palm City, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/145,264

(22) Filed: May 3, 2016

(65) Prior Publication Data

US 2016/0325830 A1    Nov. 10, 2016

Related U.S. Application Data

(60) Provisional application No. 62/157,651, filed on May 6, 2015.

(51) Int. Cl.

| | | |
|---|---|---|
| *B64C 27/82* | (2006.01) | |
| *G05D 1/08* | (2006.01) | |
| *B64C 13/16* | (2006.01) | |
| *B64C 27/57* | (2006.01) | |
| *B64D 25/00* | (2006.01) | |
| *B64C 27/605* | (2006.01) | |

(52) U.S. Cl.
CPC .............. *B64C 27/82* (2013.01); *B64C 13/16* (2013.01); *B64C 27/57* (2013.01); *B64C 27/605* (2013.01); *B64D 25/00* (2013.01); *G05D 1/0858* (2013.01); *B64C 2027/8227* (2013.01)

(58) Field of Classification Search
CPC ....... B64C 27/82; B64C 27/57; B64C 27/605; B64C 13/16; B64C 2027/8227; B64D 25/00; G05D 1/0858

See application file for complete search history.

(56) References Cited

U.S. PATENT DOCUMENTS

| | | | | |
|---|---|---|---|---|
| 2,771,143 | A * | 11/1956 | Campbell | B64C 27/14 416/123 |
| 2,842,867 | A * | 7/1958 | Dehmel | G09B 9/206 434/51 |
| 3,129,904 | A * | 4/1964 | Hanson | F16C 27/066 244/17.19 |
| 3,138,349 | A * | 6/1964 | Piasecki | B64C 27/26 224/230 |
| 3,241,791 | A * | 3/1966 | Piasecki | B64C 27/82 244/17.19 |
| 3,744,743 | A * | 7/1973 | Nay | B64C 27/12 244/17.11 |
| 4,347,997 | A * | 9/1982 | Byham | B64C 27/82 244/17.13 |

(Continued)

*Primary Examiner* — Rodney A Butler
(74) *Attorney, Agent, or Firm* — Cantor Colburn LLP

(57) ABSTRACT

A tail rotor recovery control system has a detection module configured to detect a loss of tail rotor drive from a tail rotor sensor of an aircraft; and a regulation module configured to augment or deactivate manual flight control signals and transmit automated signals to control modules of a primary flight control system. The automated signals facilitate the aircraft to attain or maintain a preset tip path plane level, attain or maintain a preset aircraft state, or to execute an automated recovery to forward flight.

15 Claims, 5 Drawing Sheets

(56) References Cited

U.S. PATENT DOCUMENTS

| | | | |
|---|---|---|---|
| 5,239,468 A * | 8/1993 | Sewersky | B64F 5/0045 |
| | | | 701/14 |
| 8,196,855 B2 | 6/2012 | Balkus | |
| 8,231,077 B2 | 7/2012 | Botich | |
| 8,430,353 B2 | 4/2013 | Botich | |
| 8,794,565 B2 | 8/2014 | Botich | |
| 2009/0012658 A1 * | 1/2009 | Cherepinsky | B64C 27/006 |
| | | | 701/3 |
| 2009/0101753 A1 | 4/2009 | Kassai et al. | |
| 2009/0177292 A1 * | 7/2009 | Mossman | G05B 23/0235 |
| | | | 700/30 |
| 2011/0172855 A1 * | 7/2011 | Marstall | G01C 23/00 |
| | | | 701/9 |
| 2012/0292433 A1 * | 11/2012 | Botich | B64C 5/12 |
| | | | 244/17.19 |
| 2014/0374534 A1 | 12/2014 | McCollough et al. | |

\* cited by examiner

TAIL ROTOR FAILURE RECOVERY CONTROLLER

CROSS-REFERENCE TO RELATED APPLICATIONS

This application claims priority to provisional U.S. Patent Application Ser. No. 62/157,651 filed on May 6, 2015, the disclosure of which is incorporated by reference herein in its entirety.

FIELD OF THE INVENTION

The subject matter disclosed herein relates to aircraft flight control systems, and in particular to a tail rotor failure recovery control system.

BACKGROUND

Tail rotor drive failure in a rotary wing aircraft often results in significant difficulty in controlling the aircraft.

In mechanically controlled aircraft, the pilot is responsible for detection and control in the event of a tail rotor drive or control failure, for example. In a modern fly-by-wire aircraft, the flight control system can detect any resulting failure and adjust the control system accordingly. Additionally, a large vertical tail surface of the aircraft may allow for controlled flight within the envelope of the aircraft even if the tail rotor fails, so long as the control system does not complicate the disturbance and the aircraft has sufficient forward velocity such that the vertical tail is effective at providing anti-torque. The present invention provides an improved ability to control the rotorcraft subsequent to loss anti-torque while in flight regimes in which the vertical tail is ineffective.

BRIEF DESCRIPTION OF THE INVENTION

In one aspect, a tail rotor recovery control system comprises a detection module configured to detect a loss of tail rotor drive from a tail rotor sensor(s) on the an aircraft; and a regulation module configured to augment or deactivate manual flight control signals and transmit automated signals to control modules of the primary flight control system, the automated signals facilitate the aircraft flight control system ability to maintain or attain a predetermined main rotor tip path plane to achieve controlled flight. This augmentation may include redefining the pilot cyclic stick or side-arm controller inputs from commands with respect to the aircraft frame of reference to commands with respect to the inertial reference frame.

In addition to one or more of the features described above or below, or as an alternative, further embodiments could the control modules of the primary flight control system including a yaw rate control module, a pitch control module, a roll control module, and a lift control module.

In addition to one or more of the features described above or below, or as an alternative, further embodiments could include a speed module that reduces the torque required on a rotor for a given power demand of the aircraft by instructing the lift control module to overspeed the rotor.

In addition to one or more of the features described above or below, or as an alternative, further embodiments could include a swashplate sensor to monitor the swashplate orientation or axis in a primarily inertial reference frame.

In addition to one or more of the features described above or below, or as an alternative, further embodiments could include a speed module with a yaw rate and the speed module interfacing with the yaw sensor.

In addition to one or more of the features described above or below, or as an alternative, further embodiments could include the manual flight control signals sent from at least one of a collective controller and a cyclic controller.

In another aspect, a tail rotor recovery control method comprises detecting a loss of tail rotor drive from a tail rotor sensor of an aircraft; and deactivating manual flight control signals; and transmitting automated signals to control modules of a primary flight control system. The automated signals facilitate the aircraft to maintain or attain a preset tip path plane level.

In another aspect, an aircraft including a tail rotor recovery control system comprises a detection module configured to detect a loss of tail rotor drive from a tail rotor sensor of an aircraft; and a regulation module configured to augment or deactivate manual flight control signals and transmit automated signals to control modules of a primary flight control system, the automated signals facilitate the aircraft to maintain or attain a preset tip path plane level.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
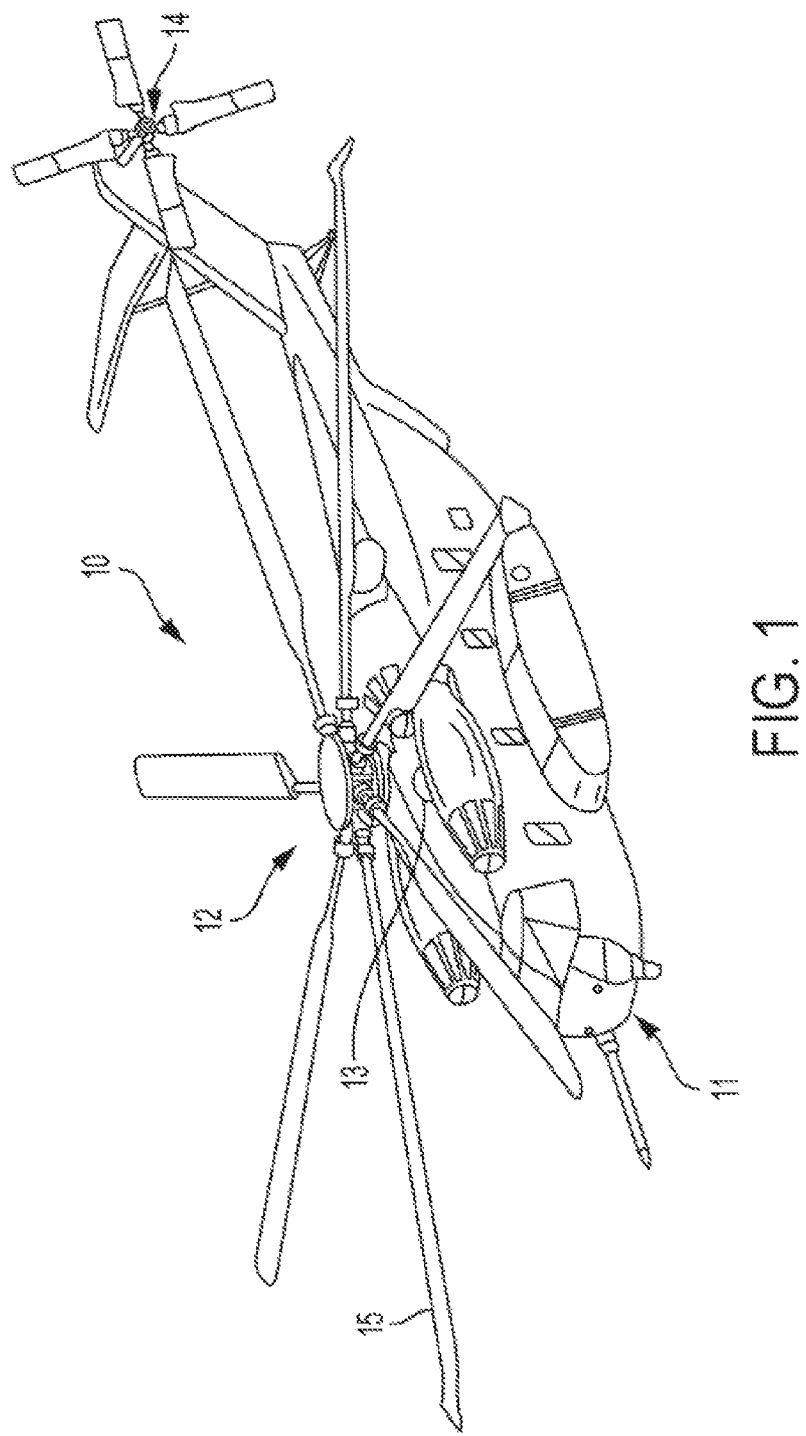
FIG. 1 is a general view of an exemplary rotary wing aircraft in accordance with one embodiment of the subject invention.

FIG. 1 illustrates a view of a rotary wing aircraft 10 in accordance with one embodiment of the present invention. The rotary wing aircraft 10 includes a fuselage 11, main rotor assembly 12, a tail rotor assembly 14, and main rotor blades 15. Although a helicopter configuration is disclosed and illustrated herein, other configurations and/or machines, such as high speed compound rotary-wing aircraft with supplemental translational thrust systems and other aircraft which require anti-torque to be provided such as tail fans, tail rotors, props, fans, thrusters, aerodynamic surfaces, tail booms utilizing the coanda effect, multi-rotors, etc., will benefit from the present invention.

Figure 2:
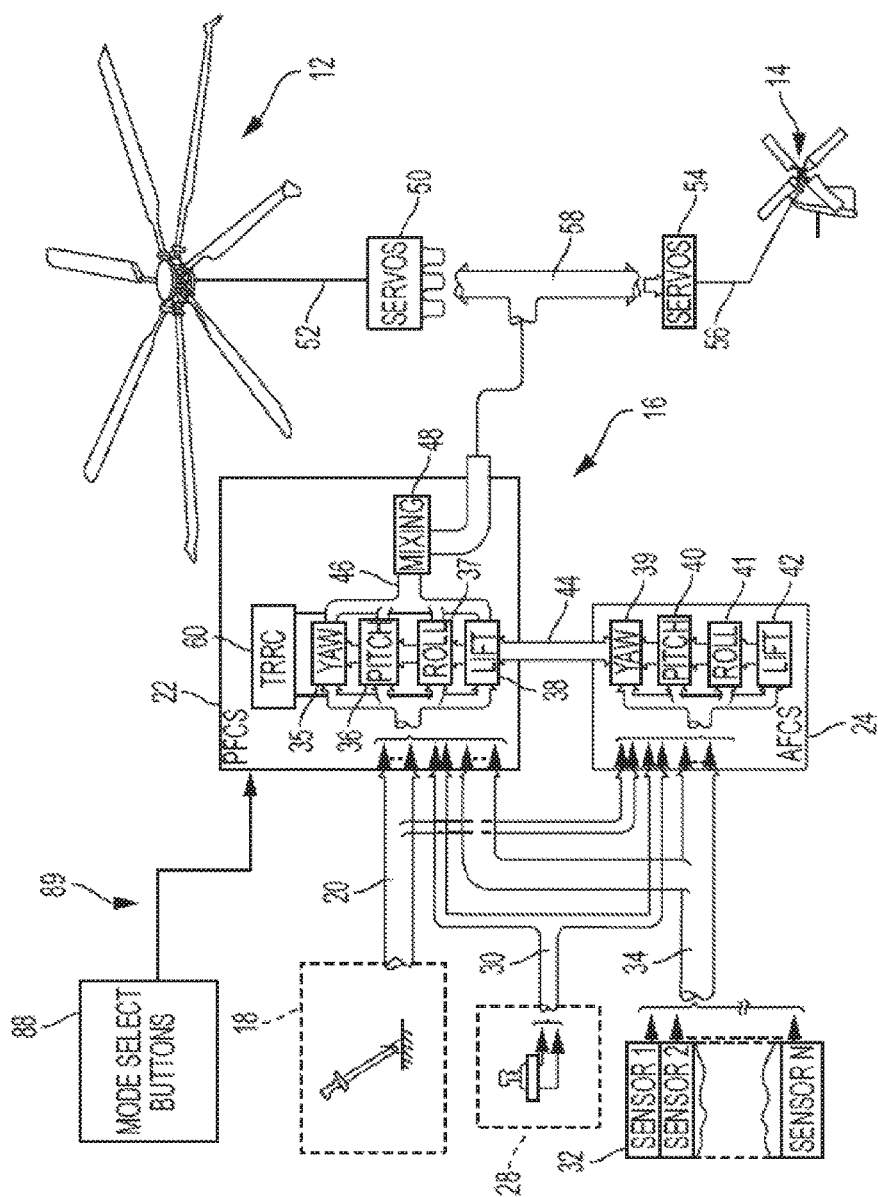
FIG. 2 is a block diagram of control systems of the exemplary rotary wing aircraft in accordance with one embodiment of the subject invention.

Referring to FIG. 2, a flight control system 16 may include a model following control system. In some embodiments, the flight control system 16 may be a conventional helicopter with appropriate sensors and stability augmentation system control authority (SAS) In other embodiments, the flight control system 16 may be a fly-by-wire flight control system. In the model following control system embodiment, the control system shapes the pilot's controller and displacement commands through an inverse vehicle model to produce the desired aircraft response. The system 16 includes a Primary Flight Control System (PFCS) 22 and an Automatic Flight Control System (AFCS) 24. Although a particular fly-by-wire system is disclosed and illustrated herein, other fly-by-wire control input methods as well as mechanically controlled helicopters with automated stability augmentation systems may also benefit from the present invention.

The Primary Flight Control System 22 is the flight critical portion of the flight control system. The Automatic Flight Control System 24 is the mission critical portion. The AFCS 24 augments the performance of the PFCS 22. The PFCS 22 and AFCS 24 execute explicit model following control laws to provide both control and stability augmentation. In this control law architecture, pilot responses are shaped directly into desired aircraft commands. These desired commands are then passed through an inverse aircraft model to obtain the control commands required to produce the desired command. The difference between the desired command and the aircraft response is also fed back to drive these errors towards zero, thus improving the model following performance.

The PFCS 22 and AFCS 24 each receive the output command signals of a collective controller 18 on line 20, a cyclic controller 28 on line 30, mode select buttons 88 on line 89, and the aircraft's sensed parameter signals from sensors 32, on lines 34. The collective controller 18 and the cyclic controller 28 may take various forms including cyclic sticks, sidearm controllers, sidearm controllers with yaw command, a yaw pedal system or other such flight controllers. Furthermore, in general, the cyclic controller 28 controls the pitch and roll of the aircraft and may output mechanical or electric command signals on line 30 as appropriate to the aircraft type. The pilot command signals on lines 20, 30, 89 and the sensed parameter signals on lines 34 are shown consolidated within the PFCS 22 and AFCS 24, respectively.

Figure 3:
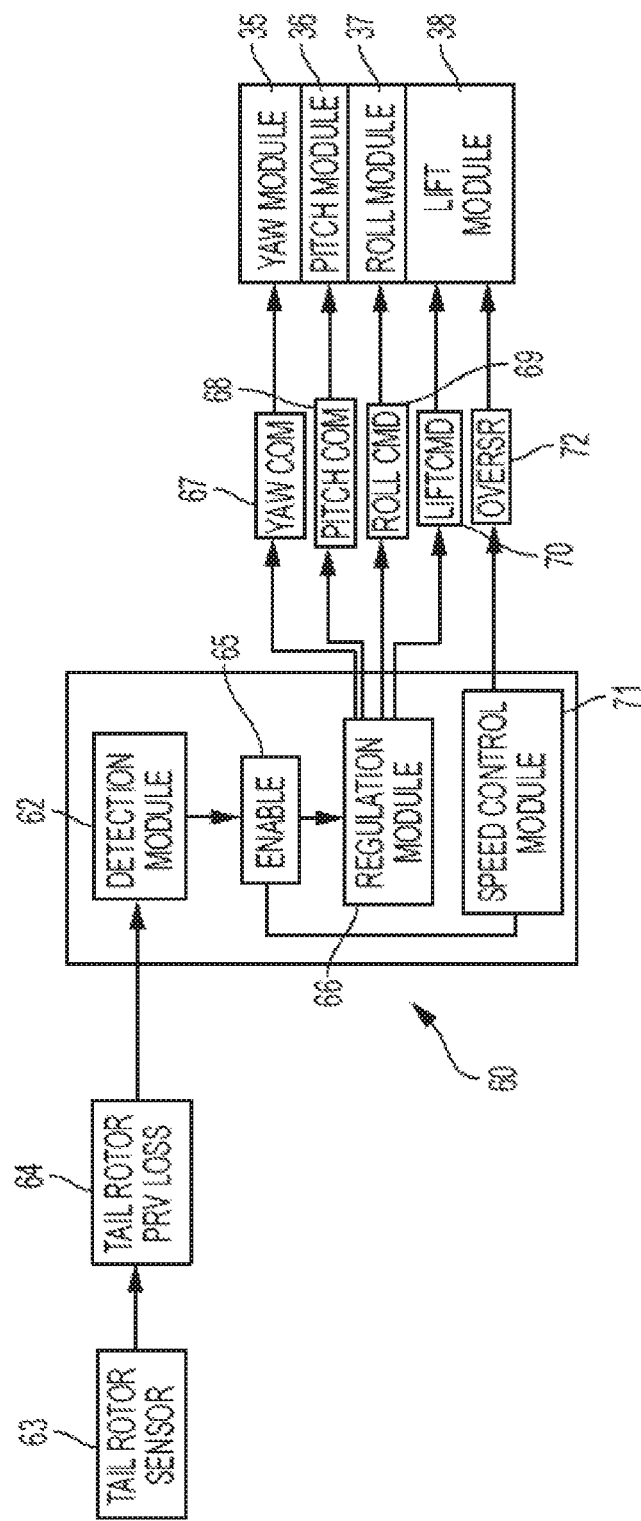
FIG. 3 is a block diagram of a tail rotor recovery controller in accordance with one embodiment of the subject invention.

The PFCS 22 and AFCS 24 may each contain separate control channel logic laws for controlling the yaw, pitch, roll and lift axes of the aircraft, as shown in more detail in FIG. 3. The logic is included in the PFCS and AFCS control modules (schematically represented by blocks 35-38 for the PFCS and blocks 39-42 for the AFCS). The sensed parameter signals from aircraft sensors 32, on lines 34, provide the PFCS and AFCS with the aircraft's angular rate and attitude response to the rotor command signals. The PFCS logic provides rotor command signals and the AFCS logic provides conditioning and/or trimming of the PFCS four axis logic functions. The PFCS and AFCS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the tail rotor servos 54 which control the thrust of the tail rotor 14 through linkages 56.

A tail rotor recovery controller (TRRC) 60 is included within the PFCS 22. The tail rotor recovery controller 60 monitors the sensed parameter signals from aircraft sensors 32 on lines 34. If a tail rotor failure is detected from one of the aircraft sensors 32, the tail rotor recovery controller 60 may limit the output command signal provided by the collective controller 18 on line 20 and may limit the output command signal provided by the cyclic controller 28 on line 30, for example. As described in more detail below, the tail rotor recovery controller 60 controls the PFCS control modules (blocks 35-38) which include at least the pitch module 36 and roll module 37 in the event of a tail rotor failure.

As used herein, the terms module and sub-module refer to an application specific integrated circuit (ASIC), an electronic circuit, multi-in multi-out (MIMO) control systems with at least some channels optimized, a processor (shared, dedicated, or group) and memory that executes one or more software or firmware programs, a combinational logic circuit, and/or other suitable components that provide the described functionality. As can be appreciated, the modules shown in the figures can be combined and/or further partitioned.

Figure 5:
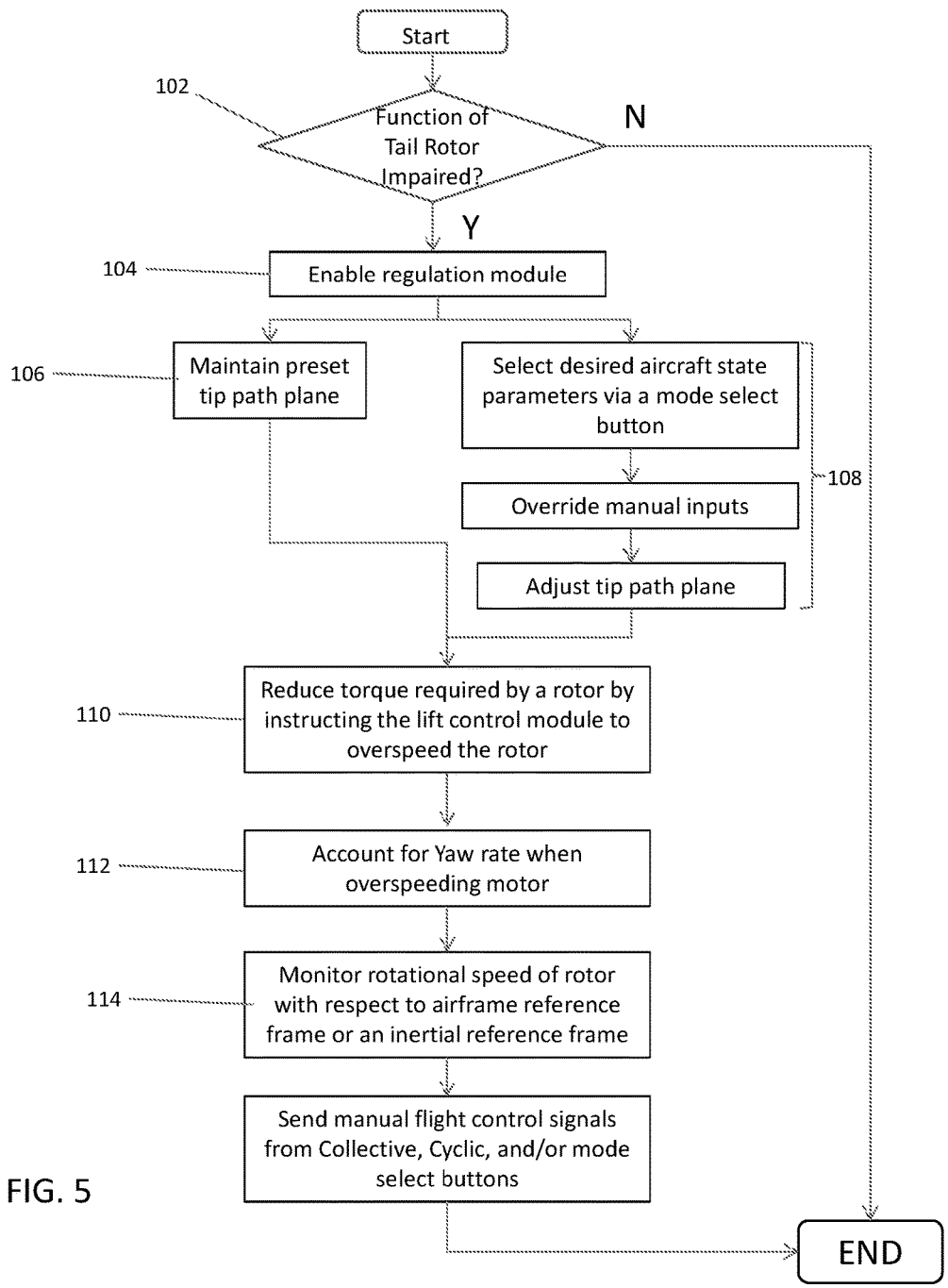
FIG. 5 is a flow diagram of a tail recovery control method in accordance with an embodiment.

Referring to FIG. 3 and FIG. 5 with continuing reference to FIGS. 1 and 2, a tail rotor recovery controller 60 in accordance with one embodiment of the present invention is illustrated. The tail rotor recovery controller 60 includes a detection module 62 that receives data from the aircraft sensors 32, including a tail rotor sensor 63. The tail rotor sensor senses the movement of the tail rotor assembly 14. For example, the tail rotor sensor 63 may output a tail rotor drive loss signal 64 on line 34 if the function of the tail rotor assembly 14 becomes impaired (block 102). The rotary wing aircraft 10 may become unstable with the loss of tail rotor drive, making the PFCS 22 unable to properly compensate for this instability.

The detection module 62 of the tail rotor recovery controller 60 is configured to communicate with a regulation module 66. Upon detection of the tail rotor drive loss signal 64 by the detection module 62, the detection module 62 provides an enable command 65 (block 104) that enables operation of the regulation module 66 of the tail rotor recovery controller 60.

In one embodiment, the regulation module 66 sends at least one of a yaw command 67, a pitch command 68, a roll command 69, and a lift command 70 to the PFCS control modules (blocks 35-38) to initially maintain a preset tip path plane level with respect to the inertial reference frame (block 106). In another embodiment, the lift command 70 may not be required with the lift command being manually provided by the pilot collective stick to increase altitude or command a ditch. The tip path plane level may then be adjusted as required to attain a desired aircraft state parameters such as horizontal velocity and altitude which may be pre-selected by mode select buttons 88 (block 108). Consequently, the regulation module 66 may override the manual inputs from collective controller 18 and cyclic controller 28, and provide for a controlled, automated departure or a controlled, pilot-commanded ditch of the rotary wing aircraft 10 despite the loss of tail rotor functionality. It must be appreciated that during this automated recovery, the airframe 11 will be rotating with respect to inertial space until the aircraft touches down or the aircraft attains sufficient horizontal velocity such that the vertical tail is effective at providing anti-torque.

Mode select buttons 88 may be separate from or integrated on the collective controller 18 or the cyclic controller 28. The mode select buttons 88 may be configured to define the operational mode of the tail rotor recovery controller 60. Additionally, the mode select buttons 88 may be integrated into existing buttons and over-ride functionality of other buttons such as a "DEPART" button. Upon activation of the tail rotor recover controller 60 regulation module 66 (See FIG. 3), the "DEPART" button could command the tail rotor recovery controller 60 to execute a controlled departure from hover, even with a failed tail rotor. As such, the aircraft may be under the control of the tail rotor recovery controller 60, as opposed to the normal depart mode controller.

In particular, the regulation module 66 may send an appropriate signal to the yaw module 35, pitch module 36, roll module 37 and lift module 38 to allow for the rotary wing aircraft 10 fuselage 11 to spin in a controlled manner while the main rotor 12 provides lift.

Optionally, in FIG. 3, a speed module 71 reduces the torque required for a given power demand by the main rotor 12, by sending an overspeed command 72 to the lift module 38 (block 110). The overspeed command 72 overspeeds the main rotor 12 and may be classified as a yaw command 67 under certain embodiments. The overspeed command of the main rotor 12 takes into account the yaw rate and the speed module 70 interfaces with the yaw sensor (block 112). The speed module 71 may also be used to maintain the main rotor speed with respect to the inertial reference frame as the engines, gearboxes 13, and rotor speed sensors are typically attached to fuselage 11, which may be in a rotating reference frame, and thus the rotor speed measured by the aircraft is typically biased by fuselage 11 yaw rate when comparing sensed rotor speed with actual rotor speed in the inertial reference frame. Additionally, aircraft sensors 32 could include a rotor speed sensor on the rotor system such that direct measurement of rotor speed with respect to the inertial reference frame and surrounding air-mass is possible (block 114).

Figure 4:
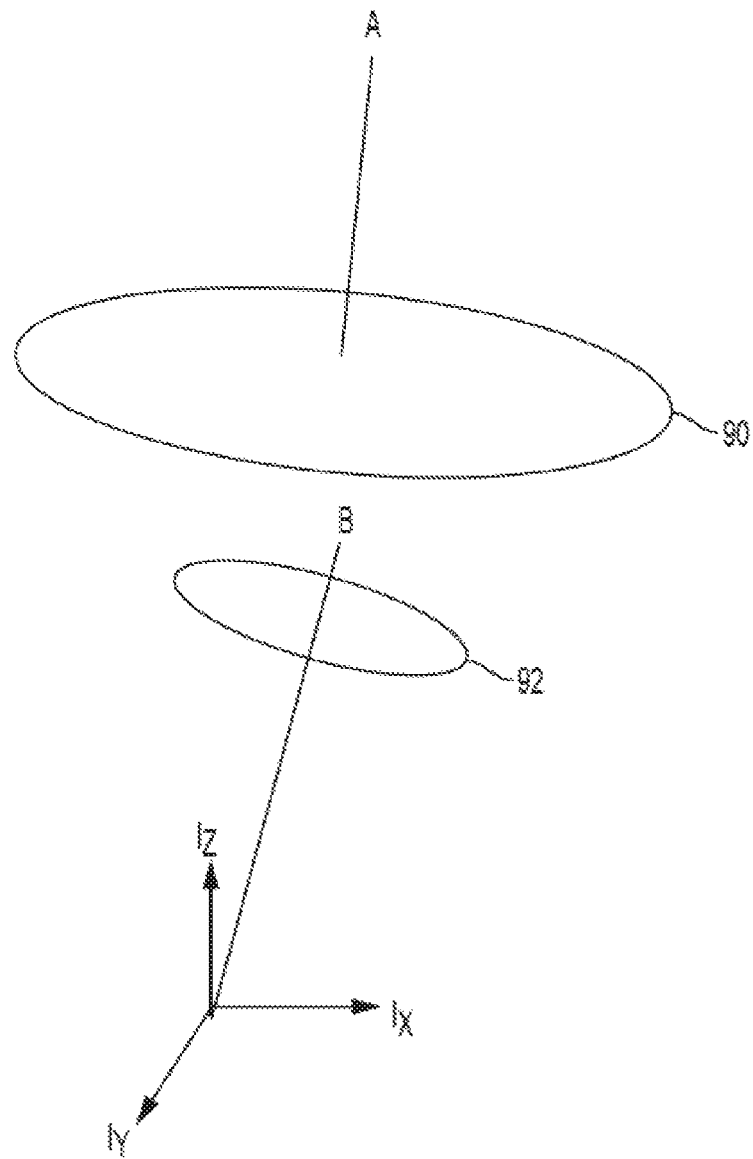
FIG. 4 is a diagram showing the relative orientation of the swashplate axis and the rotor axis with respect to an inertial reference frame for a swashplate configured aircraft in accordance with one embodiment of the subject invention.

Optionally, in FIG. 4 with continuing reference to FIGS. 1 and 2, an aircraft configured with a swashplate within the linkages 52 which control the tip path plane of the rotor, a swashplate sensor is included in the aircraft sensors 32 to monitor the orientation of swashplate axis B, perpendicular to the swashplate plane 92, with respect the inertial reference frame defined by axes Ix, Iy, and Iz. Such a sensor provides a signal which may be used to determine the main rotor blade 15 blade pitch command transmitted by linkages 52 from the swashplate to the main rotor 12 in the inertial reference frame and thus may assist with stabilizing the main rotor 12 tip path plane 90 axis of rotation A in the inertial reference frame by providing the PFCS 20 and, more specifically, the tail rotor recovery controller 60, with additional information to command the servos 50 to control the swashplate plane 92 to the desired orientation such that the preset aircraft state may be maintained or recovery to a safe forward flight condition may be effected. It is noted that the aforementioned swashplate sensor could be a physical sensor on or near the swashplate, or could be a derived sensor which combines aircraft sensor 32 information inside the logic of the PFCS 20. Additionally, to those skilled in the art, similar sensor arrangements may be implemented for rotorcraft which do not implement cyclic and or collective control with a swashplate to sense blade pitch commands to the main rotor blade 14 with respect to the inertial reference frame defined by axes Ix, Iy, and Iz to provide feedback to the PFCS 20 such that appropriate commands may be provided to the servos 50, which may be in a non-inertial rotating reference frame such as that affixed to the main rotor 12 or airframe 11, in order to compensate for the airframe 11 rotation when commanding tip path plane 90 orientation. As will be appreciated, the servo commands provided to the servos 50 by the regulators 66, which are affixed to the airframe 11 and may be rotating about an axis substantially parallel to the tip path plane axis A, may be sinusoidal or oscillatory in order to control the swashplate plane 92 and rotor plane 90 to the desired planar levels during the recovery.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tail rotor recovery control system comprising:
a detection module configured to detect a loss of tail rotor drive from a tail rotor sensor of an aircraft;
a regulation module operable in response to an enable command output from the detection module upon determining the loss of tail rotor drive, the regulation module being configured to augment or deactivate manual flight control signals and transmit automated signals to control modules of a primary flight control system, the automated signals facilitate the aircraft to maintain or attain a tip path plane level to achieve desired aircraft state parameters;
a lift control module; and
a speed module arranged in communication with the lift control module, wherein the speed module is operable to reduce the torque required for a power demand of a main rotor of the aircraft by instructing the lift control module to adjust the speed of the rotor.

2. The tail rotor recovery control system of claim 1, wherein the control modules of the primary flight control system include at least one of a yaw rate control module, a pitch control module, and a roll control module.

3. The tail rotor recovery control system of claim 1, further comprising a swashplate sensor to monitor the orientation of the swashplate.

4. The tail rotor recovery control system of claim 1, wherein instructing the lift control module to adjust the speed of the rotor includes sending an overspeed command to the lift control module.

5. The tail rotor recovery control system of claim 4, wherein the speed module includes a yaw rate and the speed module interfaces with the aircraft yaw sensor.

6. The tail rotor recovery control system of claim 1, wherein the manual flight control signals are sent from at least one of a collective controller, a cyclic controller, and mode select buttons.

7. A tail rotor recovery control method comprising:
detecting at a detection module a loss of tail rotor drive from a tail rotor sensor of an aircraft;
sending an enable command from the detection module to a distinct regulation module in response to detecting the loss of tail rotor drive; and
augmenting or deactivating manual flight control signals and transmitting automated signals to control modules of a primary flight control system, the automated signals facilitate the aircraft to maintain or attain a tip path plane level to achieve desired aircraft state parameters; and reducing a torque required by a main rotor of the aircraft by sending an instruction from a lift control module to a speed module to change a speed of the main rotor.

8. The method of claim 7, wherein the control modules of the primary flight control system include at least one of a yaw rate control module, a pitch control module, and a roll control module.

9. The method of claim 7, wherein reducing the torque required by the main rotor of the aircraft further comprises instructing the lift control module to overspeed the main rotor of the aircraft.

10. The method of claim 9, further comprising monitoring a rotational speed of the rotor with respect to one or more of the airframe reference frame or an inertial reference frame.

11. The method of claim 9, wherein the overspeeding of the main rotor takes into account a yaw rate.

12. The method of claim 7, wherein the manual flight control signals are sent from at least one of a collective controller, cyclic controller, and mode select buttons.

13. An aircraft including a tail rotor recovery control system, the system comprising:
a detection module configured to detect a loss of tail rotor drive from a tail rotor sensor of an aircraft; and
a regulation module operable in response to an enable command output from the detection module upon determining the loss of tail rotor drive, the regulation module being configured to augment or deactivate manual flight control signals and transmit automated signals to control modules of a primary flight control system, the automated signals facilitate the aircraft to attain or maintain a tip path plane level to achieve desired aircraft state parameters;
a lift control module; and
a speed module arranged in communication with the lift control module, wherein the speed module is operable to reduce the torque required for a power demand of a main rotor of the aircraft by instructing the lift control module to adjust the speed of the rotor.

14. The aircraft of claim 13, the control modules of the primary flight control system include a yaw rate control module, a pitch control module, and a roll control module.

15. The aircraft of claim 13,
wherein instructing the lift control module to adjust the speed of the rotor includes sending an overspeed command to the lift control module.

* * * * *